March 26, 1963  L. KUNTZ  3,082,751
CYLINDER-HEAD FOR INTERNAL COMBUSTION ENGINE
Filed Nov. 14, 1960
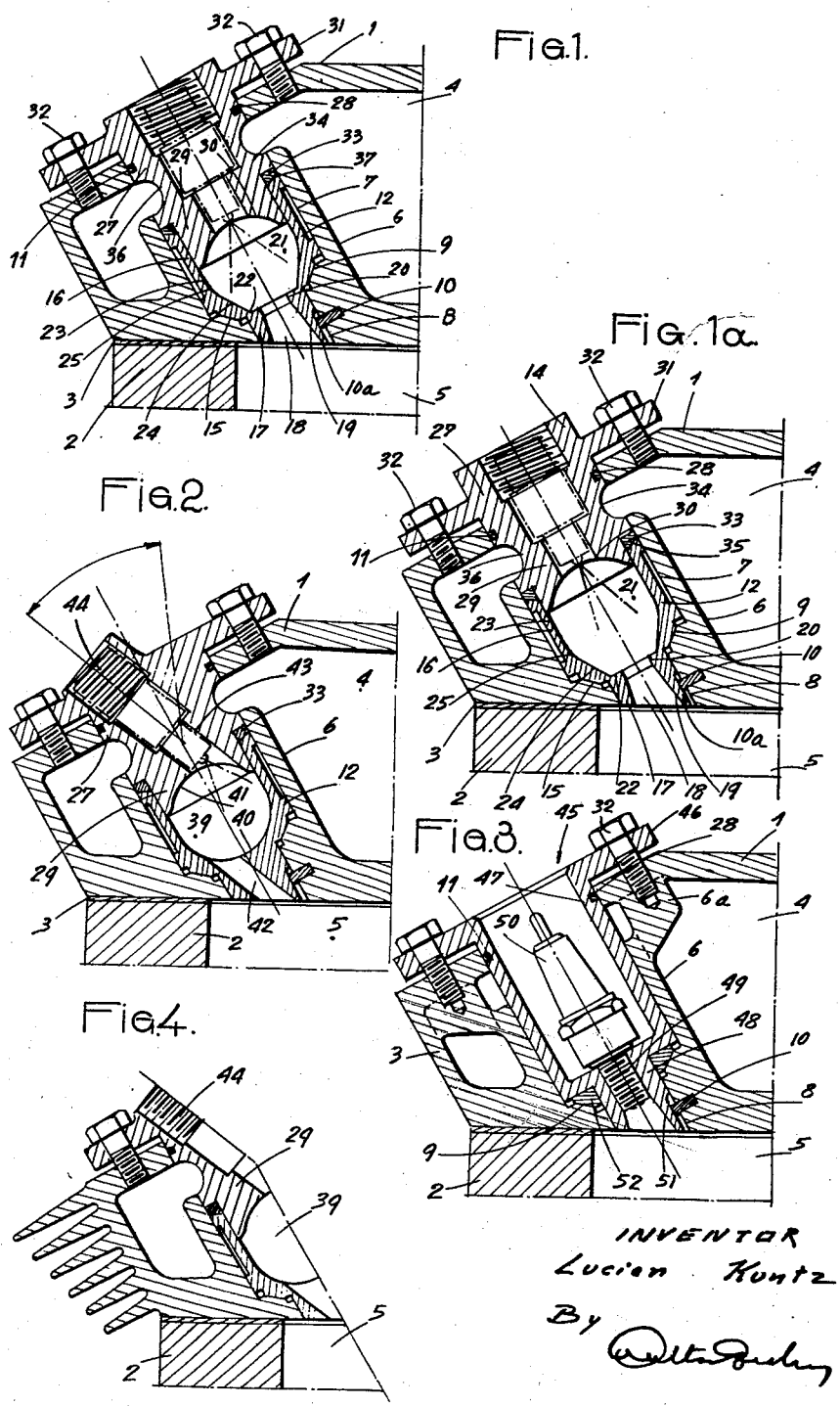
INVENTOR
Lucien Kuntz
By

United States Patent Office 3,082,751
Patented Mar. 26, 1963

3,082,751
CYLINDER-HEAD FOR INTERNAL COMBUSTION ENGINE
Lucien Kuntz, 218 Blvd. de La Republique, Saint-Cloud, France
Filed Nov. 14, 1960, Ser. No. 68,708
Claims priority, application France Nov. 16, 1959
6 Claims. (Cl. 123—32)

This invention relates to a cylinder-head intended to cover the cylinder-block of an internal combustion engine able to operate according to varied cycles such as diesel, Beau de Rochas, etc. with four-stroke or two-stroke and with various fuels.

Up till now, internal combustion engines were devised for operating according to a given cycle and with given fuels, in well-defined conditions.

According to the invention, a cylinder-head is produced on which interchangeable elements can be speedily mounted or taken down, placed opposite each cylinder, these elements, when used independently, enabling the engine to be converted so that is can operate with the fuel available. It is quite obvious that each operational cycle necessitates the putting into action of various assemblies, of which some, common to all these cycles, are permanently used for this poly-fuel engine and of which others are subject to connecting members which control their coming into action or their neutralization.

According to the invention, the cylinder-head possesses as many tubular bosses projecting as the engine block comprises in cylinders, for the positioning of interchangeable parts enabling the engine to work by means of various fuels.

According to a first form of utilization of the invention, each boss delimits two cylindrical bores connected by a tapered part forming a supporting seat for a seating formed on a staged cylindrical part which, in cooperation with an injector support clamped on to the cylinder-head, delimits a combustion chamber, the contact surface between the seat and seating being variable so as to enable the temperature of the hot point to be regulated.

According to important features of this first form of utilization:

The wall of the injector support, which delimits the combustion chamber in cooperation with the staged cylindrical part, has a hemispherical shape, a housing being hollowed out in the injector support, normal to this wall, for holding the injector jet;

The housing of the injector jet emerging into the combustion chamber is drilled in the injector support tangently to the hemispherical wall of the latter;

The combustion chamber of the staged cylindrical part is delimited by a spherical wall whose centre of curvature is blended with that of the hemispherical wall of the injector support, a transfer duct being bored tangent to this spherical wall to emerge above the corresponding cylinder;

The transfer duct bored in the staged cylindrical part comprises a converging portion and a cylindrical portion, the latter emerging in the combustion chamber of the part which is delimited by a flat wall, forming an abrupt flare, by a diverging wall and a cylindrical wall connected to the former by an incurved wall.

According to a second form of utilization of the invention, one of the interchangeable parts mounted in each tubular boss of the cylinder-head is formed by a casing, making a recess, which is clamped on to this cylinder-head, a tapped hole being made in the end of the recess for fixing a spark plug, then this hole being connected, by a diverging duct, to the corresponding cylinder.

Various other characteristics of the invention will moreover be revealed by the detailed description which follows.

Forms of embodiment of the purpose of the invention are shown, by way of non-restrictive examples, in the attached drawings.

FIGS. 1, 1a, 2, and 3 are partial sections of a cylinder-head, showing, according to the invention, various combinations for mounting fuel supply and ignition elements on this cylinder-head.

FIG. 4 is a fragmentary view showing cooling fins.

FIGS. 1a, 2, and 3 show a cylinder-head 1 placed on a cylinder-block 2 and attached, by known means, a gasket 3 being inserted between the cylinder-head and cylinder-block. The cylinder-head 1 has an internal cavity 4 in which the cooling water circulates which traverses, outside the engine, a heat exchanger, by means of which it gives off into the ambient air the heat stored up in the cylinder-head.

The cylinder-head has projecting into the cavity 4, and facing each cylinder 5 in block 2, a tubular boss 6 sloped in relation to the axis of said cylinder. The slope of the boss can be chosen between two limits for which this boss is parallel and perpendicular, respectively, to the axis of the cylinder. The boss can also be made at any point on the remaining free part of the cylinder-head.

This boss has therein two cylindrical bores 7 and 8 connected by a tapered part 9 forming a seat. A lug 10 is tightly inserted in the cylinder-head 1 so that one of its ends projects slightly in the bore 8 for forming a guiding or key element; furthermore, circular orifices 11 are bored in the upper wall of the cylinder-head coaxially with the bosses 6.

FIG. 1 shows a first form of adaptation of the cylinder-head whereby a tubular element 12 is positioned in the boss 6 and is secured therein by a part, hereafter called an injector support, indicated at 13 in FIG. 1 and at 14 in FIG. 1a. The supports in FIGS. 1 and 1a are identical except for shape and are thus correspondingly numbered. The tubular element 12 comprises a tapered bearing 15 intended to be applied to the seat in tapered part 9 of the boss, when the cylindrical parts 16 and 17, formed on either side of this bearing, are engaged in the corresponding bores 7 and 8 of said boss. A partial longitudinal groove or key way 10a is cut in the part 17, so as to determine, in cooperation with the lug or key 10, the angular position of the element 12. It is quite obvious that the determining of this angular position can be obtained by any other known means, such as any other type key, needle screw, etc. able to be positioned at any other suitable spot.

Moreover, this element 12 has therein a transfer duct 18, coaxial to the boss 6, emerging in a diverging portion 19 into the cylinder 5, and by a cylindrical portion 20 into a chamber 21 hollowed out, according to the axis of the duct, in this element. The chamber 21 comprises an abrupt flare 22 connected to a cylindrical wall 23 by a diverging wall 24 and an incurved part 25.

The temperature of the walls of the transfer duct 18 can be regulated, by varying the heat exchange surfaces between the tapered bearing 15 and the seating 9. Then, the "hot point" thus determined, forms a variable parameter of self-ignition. Another important variable parameter: the temperature of the combustion chamber 21, can also be regulated by varying the exchange surface between the element 12 and the cooled walls of the cylinder-head 1, i.e., the contact surface between the cylindrical part 16 of this element and the bore 7 of the boss 6. This result is obtained by hollowing out a clearance 26 in said cylindrical part 16 over a more or less wide area.

The injector support 13 or 14 of FIGS. 1, and 1a comprises a cylindrical body 27 penetrating into the orifice 11 and into the tubular boss 6 of the cylinder-head 1, sealing at the orifice being effected by a gasket 28 of elastic heat-resisting material. The cylindrical body 27 is extended by a ferrule 29 engaged and accurately adjusted in the element 12 for closing the combustion chamber 21, this ferrule delimiting a hemispherical wall 30 of said chamber. The capacity of the latter must be variable, so as to be adapted to the self-ignition capacity of the various fuels to be utilized. To this end, the ferrule 29 has an adjustable length whose limits correspond to the injector supports 13 and 14 shown. This arrangement has the advantage of reaching the afore-mentioned result without it being necessary to alter the cylinder-head.

The injector supports 13 and 14, each has a projecting fixing lug 31 subject to the action of tightening screws or pins 32 mounted on the cylinder head 1. It is quite obvious that water-tightness must be ensured to prevent water leaks, for example, by locking the pins in tapped blind holes delimited by parts 6a (FIG. 3), formed as an extension of the boss 6 for connecting to the cylinder-head 1.

These tightening members tend to compress a metal gasket 33 inserted between a shoulder 34 connecting the body 27 to the ferrule 29 of the injector support, and the chamfered end 35 of the element 12. The metal gasket is essentially intended to effect water-tightness between the boss 6, the element 12 and the injector support 13 or 14 but also to facilitate the discharging of the heat stored up by the injector support in contact with the element 12 and the fuel mixture, towards the cooled walls of the tubular boss 6, so that the temperature of the injector supported by the part 13 or 14 is lower than a limit beyond which the deteriorating of this injector is to be feared. For the same purpose, the surface of the injector support surrounded by the cooling water is increased by any suitable means, in the example shown, by cutting a groove 36 in the body 27.

The afore-mentioned injector, which is connected to an injection pump, in turn connected to a fuel tank, is not shown, but it must be screwed and locked in a tapped hole 37 in the injector support 13 or 14, this hole being connected to the combustion chamber 21 by a housing 38 intended to hold the injector jet. The fixing of the injector in the support 13 or 14 can be effected by all known means, namely: screws, pins, lugs, etc.

This particular adaptation of the cylinder-head 1 applies of necessity to an operational cycle of an engine of the diesel type. The air charge compressed in the cylinder, during the compression stroke of the piston, traverses the throttle formed by the cylindrical portion 20 of the transfer duct 16 at high speed and abruptly expands, while penetrating into the chamber 21 level with the abrupt flare 22 for creating an intense turbulence favorable to the mixture of the fuel injected with the air, its homogenization and combustion. Furthermore, it is advisable, for obtaining a correct self-ignition and satisfactory combustion, carefully to regulate the "hot point" and keep the walls of the combustion chamber 20 at an optimum temperature. These results are easily obtained by making the above-mentioned adjustments.

When the engine is air-cooled, the cylinder-head 1, and in particular, the tublular bosses 6 are provided externally with fins, fins of this nature being shown at 53 in FIG. 4. In this case, the lug 31 of each injector support 13 or 14, is directly fixed on the corresponding boss 6, so as to compress the gasket 33 between the body 27 and the element 12, whereas this body has cooling fins jutting out on the projecting part of the boss.

FIG. 2 shows another form of adaptation of the cylinder-head 1 with the possibility of varying the internal geometrical characteristics of the element 12 and injector support 27. This element is hollowed out for delimiting a combustion chamber 39 whose cylindrical walls are connected by a spherical cap-shaped part 40. The ferrule 29 of the injector support 27 closes the chamber along a hemispherical wall 41 whose centre of curvature is appreciably blended with that of the spherical cap.

A transfer duct 42 is bored in the element 12 so as tangentially to emerge into the combustion chamber for setting up a whirl-wind movement during the penetration of the charge of air. The transfer duct 42 is sloped in relation to the axis of the tubular boss 6. In the same way, a housing 43 containing a tapped hole 44 for supporting the injector, is so formed for containing the jet of the latter in the injector support 27, at such a slope that it emerges tangentially in the chamber 39. Consequently, the slope of the transfer duct 42 and housing 43 as well as the shape imparted to the casing of the chamber 39 can form other adjustable parameters.

FIG. 3 shows another form of adaptation of the cylinder-head 1 applied to an operational cycle in which the ignition of the mixture is controlled by sparks. In this case the element 12 and the injector support 27 corresponding to each cylinder 5 of the engine, are replaced by a recessed member 45. The latter comprises a lug 46 projecting on a casing 47 and fixed on the cylinder-head 1 by means of screws 32. The lower part of the casing forms a grooved sleeve 48. This casing and sleeve penetrate into the orifice 11 and the tubular boss 6 of this cylinder-head, and are then guided by the lug 10. A tapped hole 49 is made in the bottom of the casing and sleeve 48 in order to accommodate a spark plug 50, this tapped hole being prolonged by a diverging duct 51 emerging above the cylinder 5. Sealing of the recessed member is ensured by means of a seal ring 28 and a metal gasket 52 inserted between the seat 9 of the boss and the bottom of the casing 47. The metal gasket is strongly compressed by tightening the screws 32, which enables a satisfactory discharge of heat to be obtained through the cylinder-head, and hence, to avoid excessive heating up of the body of the plug.

Various modifications can moreover be applied to the forms of embodiment shown and described in detail, without going outside of the scope of the invention.

I claim:

1. A cylinder head for an internal combustion engine adapted for mounting on the cylinder block of the engine and having a first wall which closes the outer end of a cylinder in the block, a tubular projection on the side of the wall opposite the cylinder, said wall having a bore connecting the inside of the tubular projection with the cylinder, and said tubular projection being adapted to receive hollow interchangeable members for converting the engine from operation on one fuel to operation on another fuel, an interchangeable member in said projection, said tubular projection having a smaller bore at the cylinder end and a larger bore at the end remote from the cylinder and a tapered bore portion connecting said smaller and larger bores, said interchangeable member having a bored smaller part in said smaller bore and a bored larger part in said larger bore and a tapered portion therebetween engaging the tapered bore portion in said projection, said cylinder head having a second wall spaced from said first wall and also spaced from the outer end of said projection and bored coaxially with said tubular projection, and a support member detachably sealingly mounted in the bore in said second wall extending into said projection and including shoulder means clampingly engaging the outer end of said interchangeable member within said projection, the inner end of said support member telescopically engaging the bore in the larger part of said interchangeable member and being concave and forming a combustion chamber with the said bore in the larger part of said interchangeable member, and a heat conducting metallic sealing gasket sealingly positioned between the outer end of said interchangeable member and the shoulder on said support member and sealingly engaging the said larger bore of said projection.

2. A cylinder head according to claim 1, in which the said combustion chamber is substantially hemispherical, and said support member is bored from the outer end to said combustion chamber and is thereby adapted for supporting an injector for injecting fuel into said chamber.

3. A cylinder head according to claim 1, in which the said support member has a bore therethrough opening into the combustion chamber and adapted for receiving an injector for injecting fuel into the combustion chamber, said bore being inclined in said support member so as to enter the combustion chamber substantially tangential thereto.

4. A cylinder head for an internal combustion engine adapted for mounting on the cylinder block of the engine and having a first wall which closes the outer end of a cylinder in the block, a tubular projection on the side of the wall opposite the cylinder, said wall having a bore connecting the inside of the tubular projection with the cylinder, and said tubular projection being adapted to receive interchangeable members for converting the engine from operation on one fuel to operation on another fuel, an interchangeable member in said projection, said tubular projection having a smaller bore at the cylinder end and a larger bore at the end remote from the cylinder and a tapered bore portion connecting said smaller and larger bores, said interchangeable member having a smaller part in said smaller bore and a larger part in said larger bore and a tapered portion therebetween engaging the tapered bore portion in said projection, said cylinder head having a second wall spaced from said first wall and also spaced from the outer end of said projection and bored coaxially with said tubular projection, and a support member fixed in the bore in said second wall and clampingly engaging the said interchangeable member within said projection and forming therewith a combustion chamber, there being cooling passage means extending through said cylinder head between said first and second walls and through which said passage means said support member extends so as to be exposed to the cooling medium in said passage means, an annular groove around said support member in the region of said passage means for insuring adequate cooling of said support member, and an annular groove about the larger part of said interchangeable member within said projection to control the heat transfer therebetween.

5. A cylinder head for an internal combustion engine adapted for mounting on the cylinder block of the engine and having a first wall which closes the outer end of a cylinder in the block, a tubular projection on the side of the wall opposite the cylinder, said wall having a bore connecting the inside of the tubular projection with the cylinder, and said tubular projection being adapted to receive interchangeable members for converting the engine from operation on one fuel to operation on another fuel, an interchangeable member in said projection, said tubular projection having a smaller bore at the cylinder end and a larger bore at the end remote from the cylinder and a tapered bore portion connecting said smaller and larger bores, said interchangeable member having a smaller part in said smaller bore and a larger part in said larger bore and a tapered portion therebetween engaging the tapered bore portion in said projection, said cylinder head having a second wall spaced from said first wall and also spaced from the outer end of said projection and bored coaxially with said tubular projection, and a support member sealingly mounted in the bore in said second wall and clampingly and sealingly engaging the said interchangeable member within said projection and forming therewith a combustion chamber, there being cooling passage means extending through said cylinder head between said first and second walls and through which said passage means said support member extends so as to be exposed about its entire periphery to the cooling medium in said passage means, an annular groove around said support member in the region of said passage means for insuring adequate cooling of said support member, a key member fixed to the cylinder head and extending into the said smaller part of the bore, and a slot in the smaller part of the said interchangeable member receiving said key, said support member having a bore leading from the outer end thereof to said combustion chamber, and another bore in the said smaller portion of said interchangeable member leading from said combustion chamber into said cylinder.

6. The combination according to claim 5, in which said interchangeable member has an annular groove about the larger part thereof to limit the area that is in contact with the wall of said projection thereby to control the heat transfer between the said projection and said interchangeable member.

References Cited in the file of this patent

UNITED STATES PATENTS

| | | |
|---|---|---|
| 2,012,895 | Sidney | Aug. 27, 1935 |
| 2,058,827 | Ricardo | Oct. 27, 1936 |
| 2,148,505 | Rosen | Feb. 28, 1939 |
| 2,710,602 | Maybach | June 14, 1955 |

FOREIGN PATENTS

| | | |
|---|---|---|
| 810,288 | Great Britain | Mar. 11, 1959 |